US012154161B2

(12) United States Patent
Zagorin et al.

(10) Patent No.: US 12,154,161 B2
(45) Date of Patent: Nov. 26, 2024

(54) OMNICHANNEL PROCUREMENT ORCHESTRATION METHOD AND SYSTEM FOR GENERATING RECOMMENDATIONS AND SCORING IMPACT

(71) Applicant: Arkestro Inc., San Francisco, CA (US)

(72) Inventors: Edmund Adam Zagorin, San Francisco, CA (US); Benjamin Kingsland Leiken, Venice, CA (US)

(73) Assignee: ARKESTRO INC., San Francisco, CA (US)

(*) Notice: Subject to any disclaimer, the term of this patent is extended or adjusted under 35 U.S.C. 154(b) by 0 days.

(21) Appl. No.: 18/102,615

(22) Filed: Jan. 27, 2023

(65) Prior Publication Data

US 2024/0257207 A1    Aug. 1, 2024

(51) Int. Cl.
*G06Q 30/00*    (2023.01)
*G06Q 10/087*    (2023.01)
*G06Q 30/0601*    (2023.01)

(52) U.S. Cl.
CPC ....... *G06Q 30/0631* (2013.01); *G06Q 10/087* (2013.01); *G06Q 30/0635* (2013.01)

(58) Field of Classification Search
USPC ...................................................... 705/26.7
See application file for complete search history.

(56) References Cited

U.S. PATENT DOCUMENTS

| 10,943,308 | B1 | 3/2021 | Brandt et al. |
| 2006/0085270 | A1 | 4/2006 | Ruckart |
| 2008/0288326 | A1 | 11/2008 | Abramowicz |
| 2010/0076820 | A1 | 3/2010 | Davis |
| 2018/0308178 | A1* | 10/2018 | Engler ............... G06N 5/02 |
| 2019/0019148 | A1 | 1/2019 | Kumar |
| 2019/0180301 | A1* | 6/2019 | Mahalanobish ........ H04W 4/35 |

(Continued)

OTHER PUBLICATIONS

Yang, Y., Ji, T. and Jing, Z., Selective learning for strategic bidding in uniform pricing electricity spot market, 2021, CSEE Journal of Power and Energy Systems, 7(6), pp. 1334-1344. (Year: 2021).*

(Continued)

*Primary Examiner* — Jeffrey A. Smith
*Assistant Examiner* — Brittany E Bargeon
(74) *Attorney, Agent, or Firm* — MORRISON & FOERSTER LLP

(57) ABSTRACT

This application relates generally to an omnichannel procurement orchestration system. Systems and methods for generating a recommendation for procuring a product or service by a purchaser entity are provided. An exemplary method includes accessing data for transactions associated with a proposed procurement transaction between one of a plurality of purchaser entities and one of a plurality of supplier entities. The data is received from a plurality of disparate data sources and by way of a plurality of disparate procurement channels. The method includes determining a quantifiable feature or attribute associated with the proposed procurement transaction. The method further includes generating a recommendation for acting upon the quantifiable feature or attribute, and providing the recommendation to the one of the plurality of purchaser entities or the one of the plurality of supplier entities.

11 Claims, 8 Drawing Sheets

(56) References Cited

U.S. PATENT DOCUMENTS

| | | |
|---|---|---|
| 2019/0244268 A1 | 8/2019 | Zagorin |
| 2022/0005321 A1* | 1/2022 | Wexler ................ G07F 17/3244 |
| 2022/0138785 A1* | 5/2022 | Zarakas ................. G06N 20/00 |
| | | 705/7.35 |
| 2022/0188915 A1* | 6/2022 | Nariani .................. G06Q 30/08 |

OTHER PUBLICATIONS

Non-Final Office Action mailed on Apr. 5, 2023, for U.S. Appl. No. 18/102,616, filed Jan. 27, 2023, 13 pages.
Notice of Allowance mailed on Oct. 20, 2023, for U.S. Appl. No. 18/102,616, filed Jan. 27, 2023, 8 pages.
International Search Report and Written Opinion from the International Searching Authority mailed May 8, 2024, for International Patent Application No. PCT/US2024/012814 filed on Jan. 24, 2024, 14 pages.

* cited by examiner

OMNICHANNEL PROCUREMENT ORCHESTRATION METHOD AND SYSTEM FOR GENERATING RECOMMENDATIONS AND SCORING IMPACT

TECHNICAL FIELD

This application relates generally to an omnichannel procurement orchestration system, and, more particularly, to an omnichannel procurement orchestration system for generating recommendations and scoring impact for procuring a product or service.

BACKGROUND

Procurement services may generally include software for aiding purchaser entities to purchase and procure requisite products or services from one or more supplier entities for purposes of doing business. In many instances, procurement services and processes may rely on manual inputs from users to approve or advance a process or activity, or to combine various disparate data into a single data lake. These manual user inputs and data lakes may also be relied upon to attempt to score one or more procurement activities upon execution and completion of the one or more procurement transactions. However, as such data lakes may include various disparate and unstructured data fragmented across various databases, relying solely on manual user inputs and data lakes may impede efficiency toward executing and completing procurement transactions. It may be useful to provide techniques to improve procurement services and processes.

SUMMARY

Embodiments of the present disclosure are directed toward an omnichannel procurement orchestration system including one or more computer servers for generating a recommendation for procuring a product or service by a purchaser entity and generating one or more recommendations based on a scoring for each of a plurality of procurement activities or channels associated with procuring a product or service. In certain embodiments, the one or more computer servers may access data for a set of transactions associated with a proposed procurement transaction between at least one of a plurality of purchaser entities and at least one of a plurality of supplier entities. In some embodiments, the data for the set of transactions may be received from a plurality of disparate data sources and by way of a plurality of disparate procurement channels. In certain embodiments, the set of transactions may include a line-item, an identification of the plurality of supplier entities, and an identification of the plurality of purchaser entities. In certain embodiments, the line-item may include one or more of a price of a product or service, a quantity of the product or service, or a unit of measure (UOM) with respect to the product or service. In certain embodiments, the data for the set of transactions may include one or more of line-item master data and transaction data associated with one or more previous procurement transactions or line-item master data and transaction associated with the proposed procurement transaction.

In some embodiments, the accessed data includes one or more recommendations.

In some embodiments, a recommendation can be for a range of values (e.g. a range of acceptable quoted prices) rather than a single value.

In some embodiments, an exemplary system observes and learns from recommendations based on the attestation rate of suppliers, stakeholders and procurement approvers that legally bind their representative organizations to the values contained within the recommendations.

In certain embodiments, the one or more computer servers may determine a quantifiable feature or attribute associated with the proposed procurement transaction by comparing one or more data values associated with the proposed procurement transaction to a predicted range of values for the quantifiable feature or attribute. In some embodiments, the predicted range of values may be identified based on the data for the set of transactions received from the plurality of disparate data sources and by way of the plurality of disparate procurement channels. In certain embodiments, the quantifiable feature or attribute associated with the proposed procurement transaction may include one or more of a price of a product or service, a ranking associated with one or more of the plurality of supplier entities, a rating associated with one or more of the plurality of supplier entities, a quantity of a product or service, a spend associated with one or more of the plurality of supplier entities, a currency utilized to procure a product or service, or a unique identifier associated with the proposed procurement transaction. In certain embodiments, the predicted range of values for the quantifiable feature or attribute may include one or more statistical estimations by which the one or more data values are evaluated.

In certain embodiments, in response to the comparison of the one or more data values associated with the proposed procurement transaction and the predicted range of values for the quantifiable feature or attribute, the one or more computer servers may then generate a recommendation comprising a set of instructions for acting upon the quantifiable feature or attribute associated with the proposed procurement transaction. In certain embodiments, generating the recommendation for acting upon the quantifiable feature or attribute may include generating a recommendation of a next-best-action toward completing the proposed procurement transaction. In certain embodiments, the one or more computer servers may then provide, by way of one or more of the plurality of disparate procurement channels, the recommendation to the at least one of the plurality of purchaser entities or the at least one of the plurality of supplier entities.

In certain embodiments, the one or more computer servers may determine, based on the comparison, that the one or more data values associated with the proposed procurement transaction satisfies the predicted range of values. In response to determining that the one or more data values associated with the proposed procurement transaction satisfies the predicted range of values, the one or more computer servers may generate a recommendation to approve the proposed procurement transaction. In one embodiment, the proposed procurement transaction may be executed based on the approval.

In certain embodiments, the one or more computer servers may determine, based on the comparison, that the one or more data values associated with the proposed procurement transaction fails to satisfy the predicted range of values. In response to determining that the one or more data values associated with the proposed procurement transaction fails to satisfy the predicted range of values, the one or more computer servers may generate a recommendation to reject the proposed procurement transaction. In certain embodiments, the one or more computing devices may determine, based on the comparison, that the one or more data values associated with the proposed procurement transaction fails to satisfy the predicted range of values. In response to determining that the one or more data values associated with the proposed procurement transaction fails to satisfy the predicted range of values, the one or more computing servers may generate a recommendation to update the quantifiable feature or attribute associated with the proposed procurement transaction.

In certain embodiments, the one or more computing servers may access data for a set of transactions associated with a proposed procurement transaction between at least one of a plurality of purchaser entities and at least one of a plurality of supplier entities. In some embodiments, the data for the set of transactions may be received from a plurality of disparate data sources and by way of a plurality of disparate procurement channels. In certain embodiments, the one or more computing servers may determine, based on the data for the set of transactions associated with the proposed procurement transaction, a plurality of procurement activities to be performed to execute the proposed procurement transaction. In certain embodiments, the one or more computing servers may then generate, based on the plurality of procurement activities, a score for each of the plurality of procurement activities. In one embodiment, the score for each of the plurality of procurement activities may include a likelihood of a favorable outcome for proposed procurement transaction. In certain embodiments, the one or more computing servers may generate a recommendation based on the score for each of the plurality of procurement activities.

In certain embodiments, generating the score recommendation may include generating a score for each of the plurality of procurement activities with respect to the plurality of disparate procurement channels. In certain embodiments, the score may include an indication of a match between at least one of the plurality of procurement activities and at least one of the plurality of disparate procurement channels to be utilized to produce the favorable outcome for proposed procurement transaction. In certain embodiments, generating the recommendation may include selecting the at least one of the plurality of procurement activities and the at least one of the plurality of disparate procurement channels.

In certain embodiments, the proposed procurement transaction may be executed based on the selected at least one of the plurality of procurement activities and the selected at least one of the plurality of disparate procurement channels. In certain embodiments, the one or more computing servers may provide the recommendation to the at least one of the plurality of purchaser entities. In certain embodiments, the set of transactions may include a line-item, an identification of the plurality of supplier entities, and an identification of the plurality of purchaser entities. In certain embodiments, generating the score may include generating a prediction of the likelihood of a favorable outcome based on historical data for a set of transactions.

DESCRIPTION OF EXAMPLE EMBODIMENTS

Figure 1A:
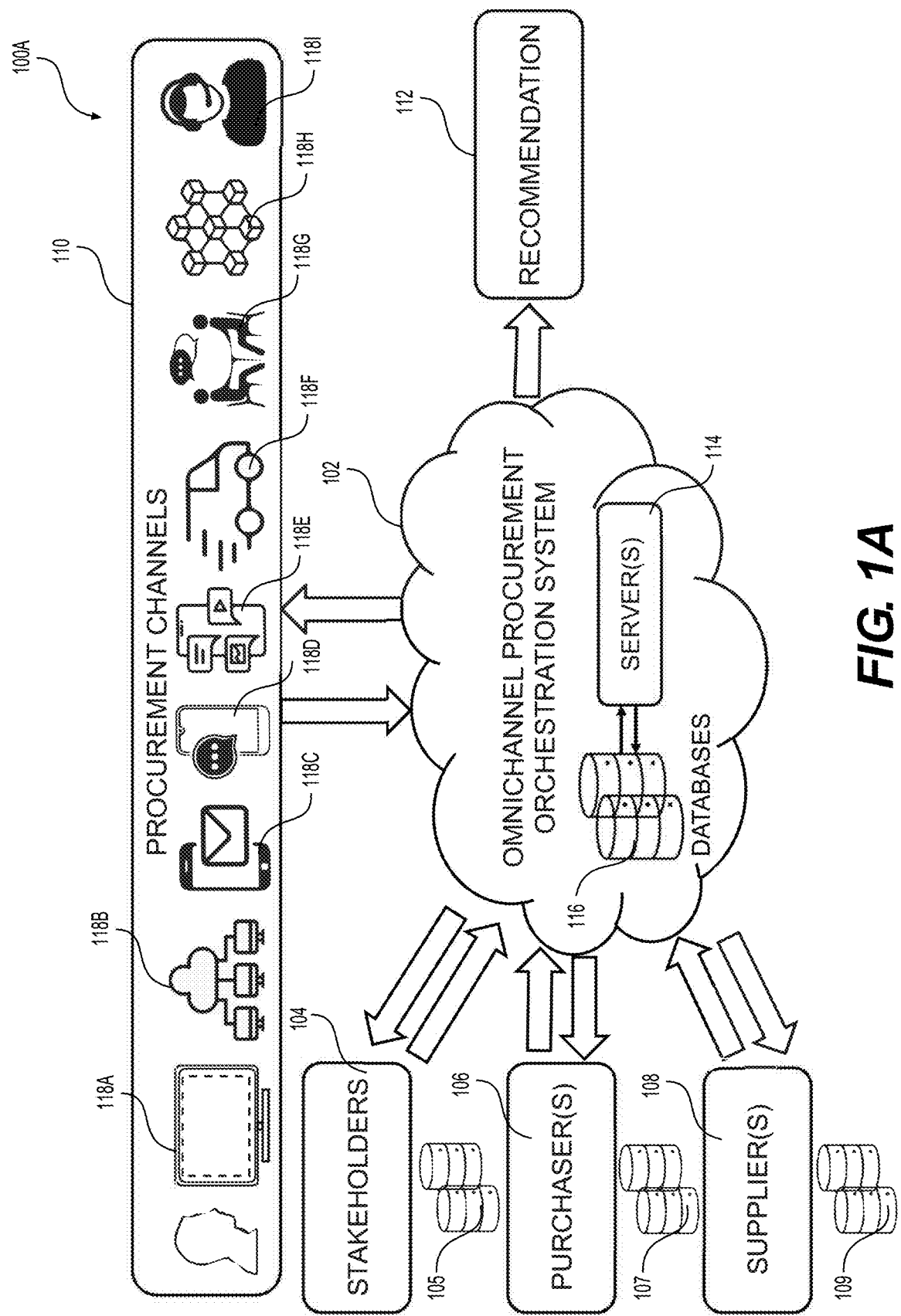
FIG. 1A illustrates an embodiment of an omnichannel procurement orchestration system and network environment.

FIG. 1A illustrates an omnichannel procurement orchestration system and network environment 100A that may be utilized for generating a personalized recommendation for procuring a product or service by at least one human entity, in accordance with the presently disclosed embodiments. As depicted, in certain embodiments, the omnichannel procurement orchestration system and network environment 100A may include an omnichannel procurement orchestration system 102, a number of stakeholder entities 104 and associated databases 105, a number of purchaser entities 106 and associated databases 107, a number of supplier entities 108 and associated databases 109, and a number of procurement channels 110. As used herein, a "procurement channel" may refer to an end-to-end series of various processes or activities suitable for requesting, approving, purchasing, receiving, and/or paying for a product or service encompassing, for example, some combination of both the manner (e.g., procurement activities to be performed by one or more purchasers, suppliers, stakeholders, and so forth) by which the series of various processes or activities may be executed and the means (e.g., communications networks, payment and transaction systems and networks, web-based services, mobile device applications, and so forth) by which the series of various processes or activities may be executed.

For example, in one embodiment, a particular purchaser entity may have an established contract (e.g., signed and executed via email) to purchase one or more products or services from a particular supplier. During the span of conducting business between the particular purchaser entity and the particular supplier entity, in some instances, one or more personnel (e.g., a buyer or purchasing agent, one or more operations, logistics, purchasing, or supply-chain managers, a chief procurement officer (CPO), a director of sourcing and procurement, one or more procurement specialists, or other similar sourcing, procurement, or supply-chain personnel) of the particular purchaser entity may conduct an in-person negotiation with one or more personnel of the particular supplier entity in which a discount (e.g., not specified within the established contract) may be requested for a proposed bulk-quantity transaction, for example. In such an instance, conducting regular procurement transactions by way of the established contract (e.g., signed and executed via email) and alternatively conducting one or more proposed procurement transactions in which a discount (e.g., not specified within the established contract) may be requested (e.g., by way of in-person negotiation) for a proposed bulk-quantity transaction may each represent a separate and distinct "procurement channel" in accordance with the presently disclosed embodiments.

In another example, the particular purchaser entity may regularly procure products or services from the particular supplier entity by way of one or more software application-based, web-based, or cloud-based purchase catalogs (e.g., hosted catalogs, punchout catalogs, and so forth) in which all prices may be preestablished. In such an instance, if one or more personnel of the particular purchaser entity were to then submit (e.g., by way of email, text message, software application, social media platform, or other similar communications or transactions system) a purchase order to the particular supplier entity in which a new price quote is requested for one or more of the regularly procured products or services from the particular supplier entity, the regular procurement by way of electronic purchase catalog and preestablished price and the purchase order and new price quote may each represent a separate and distinct "procurement channel" in accordance with the presently disclosed embodiments.

Thus, in accordance with the presently disclosed embodiments, a "procurement channel" may encompass a series of any of various processes or activities suitable for requesting, approving, purchasing, receiving, and/or paying for a product or service, and, further, some combination of both the manner (e.g., procurement activities to be performed by one or more purchasers, suppliers, stakeholders, and so forth) by which the series of various processes or activities may be executed and the means (e.g., communications networks, payment and transaction systems and networks, web-based services, mobile device applications, and so forth) by which the series of various processes or activities may be executed.

In certain embodiments, as depicted by FIG. 1A, the omnichannel procurement orchestration system 102 may access data for a set of transactions associated with a proposed procurement transaction between one or more of the number of purchaser entities 106 and one or more of the number of supplier entities 108 and/or one or more of the number of stakeholder entities 104. For example, in some embodiments, data for the set of transactions may be received by the omnichannel procurement orchestration system 102 from the databases 105 associated with the number of stakeholder entities 104, the databases 107 associated with the number of purchaser entities 106, and the databases 109 associated with the number of supplier entities 108. In some embodiments, data for the set of transactions may be received by way of the number of procurement channels 110. In some embodiments, the databases 105, 107, and 109 associated with the number of stakeholder entities 104, the number of purchaser entities 106, and the number of supplier entities 108, respectively, may be internal relational databases or external relational databases having differing protocols, schemas, languages, data structures, and so forth. In some embodiments, the differing protocols, schemas, languages, data structures, and so forth may be tracked and managed by the omnichannel procurement orchestration system 102.

In certain embodiments, the omnichannel procurement orchestration system 102 may include an omnichannel predictive procurement orchestration (PPO) system, which may include one or more computing servers 114 (e.g., processing devices) and one or more relational databases 116 (e.g., PostgreSQL, object-relational database (ORD)). In certain embodiments, the omnichannel procurement orchestration system 102 may further include a Platform as a Service (PaaS), a Software as a Service (SaaS), a Compute as a Service (CaaS), an Infrastructure as a Service (IaaS), a Data as a Service (DaaS), a Database as a Service (DBaaS), or other similar cloud-based computing architecture (e.g., "X" as a Service (XaaS)) that may be suitable for generating and providing procurement recommendations 112 based on data for a set of transactions associated with one or more proposed procurement transactions between one or more of the number of purchaser entities 106 and one or more of the number of supplier entities 108.

For example, in certain embodiments, data for the set of transactions associated with the one or more proposed procurement transactions may include one or more of transaction data, transaction data attributes, purchaser entity data attributes, transactions data attributes, line-item master data, categories master data, and supplier entity data attributes. For example, in some embodiments, the transaction data may include historical line-item data including, for example, prices of products or services previously procured, quantities of the products or services previously procured, units of measure (UOM) with respect to the products or services previously procured, and so forth. In certain embodiments, the purchaser entity data attributes may include, for example, an identification of a purchaser entity, a specific company name for the purchaser entity, a geographical location of the purchaser entity, and so forth.

Similarly, in certain embodiments, the transactions data attributes may include, for example, line-item data derived from one or more historical data sets of requisitions, invoices, purchase orders, price quotes, sourcing events, and so forth. For example, in some embodiments, the transactions data attributes may include an identification of products or services included in the historical transaction data, a price of the product or services included in the historical transactions data, a quantity of the products or services in the historical transactions data, a UOM with respect to the products or services included in the historical transactions data, a currency utilized to purchase the products or services included in the historical transactions data, an identification of the purchaser entity associated with the products or services included in the historical transactions data, a line-item identification associated with the products or services included in the historical transactions data, a category identification associated with the products or services included in the historical transactions data, a supplier entity identification associated with the products or services included in the historical transactions data, a number of the requisitions, invoices, purchase orders, or sourcing events included in the historical transactions data, and a duration associated with the requisitions, invoices, purchase orders, or sourcing events included in the historical transactions data.

In certain embodiments, the line-item master data may include, for example, a catalog or data log of all of the information that may be associated with products or services regularly, intermittently, or previously purchased by a particular purchaser entity, and may further include an identification of the purchaser entity, a description of the products or services identified by item-line, a category identification associated with the products or services, and so forth. In certain embodiments, the categories master data may include an identification category, a description category, one or more naming categories, or a parent identification category that may be associated with supplier entities, purchaser entities, and/or one or more particular products or services. In certain embodiments, the supplier entity data attributes may include, for example, an identification of supplier entities, a specific company name for supplier entities, geographical location of supplier entities, an identification of key supplier entities, an identification of valuable supplier entities, and so forth.

In certain embodiments, as will be further appreciated below with respect to FIGS. 2-6, the omnichannel procurement orchestration system 102 may generate and provide, by way of one or more of the number of procurement channels 110, a recommendation to at least one of the number of purchaser entities 106 or at least one of the number of supplier entities 108. For example, as generally depicted in FIG. 1A, the number of procurement channels 110 may include a series of any of various processes or activities suitable for requesting, approving, purchasing, receiving, and/or paying for a product or service, and, further, some combination of both the manner (e.g., procurement activities to be performed by one or more of the number of stakeholder entities 104, the number of purchaser entities 106, or the number of supplier entities 108) by which the series of various processes or activities may be executed and the means (e.g., communications networks, payment and transaction systems and networks, web-based services, mobile device applications, and so forth) by which the series of various processes or activities may be executed.

As depicted, in certain embodiments, the number of procurement channels 110 may include one or more software-based procurement applications 118A, one or more web-based or cloud-based purchase catalogs systems 118B (e.g., hosted catalogs, punchout catalogs, and so forth), one or more mobile devices 118C, 118D, 118E suitable for supporting short messaging or multimedia messaging (e.g., multimedia messaging service (MMS), short message service (SMS)), email, and social media, one or more delivery vehicle-based systems 118F, in-person negotiations 118G (e.g., face-to-face meetings, virtual negotiations, videoconferencing), Web3 applications and transactions 118H, phone-based or voiced-based procurement ordering and services 118I, and so forth. In certain embodiments, each of the number of procurement channels 110 may be associated with one or more procurement activities (e.g., creating or submitting a request, approving a request, creating or submitting a price quote or purchasing order, approving or rejecting a price quote or purchasing order, receiving or transmitting a price quote or purchasing order, confirming a price quote or purchasing order, receiving or delivering one or more products or services, receiving or submitting an invoice, approving or rejecting an invoice, paying or receiving payment for an invoice).

Figure 1B:
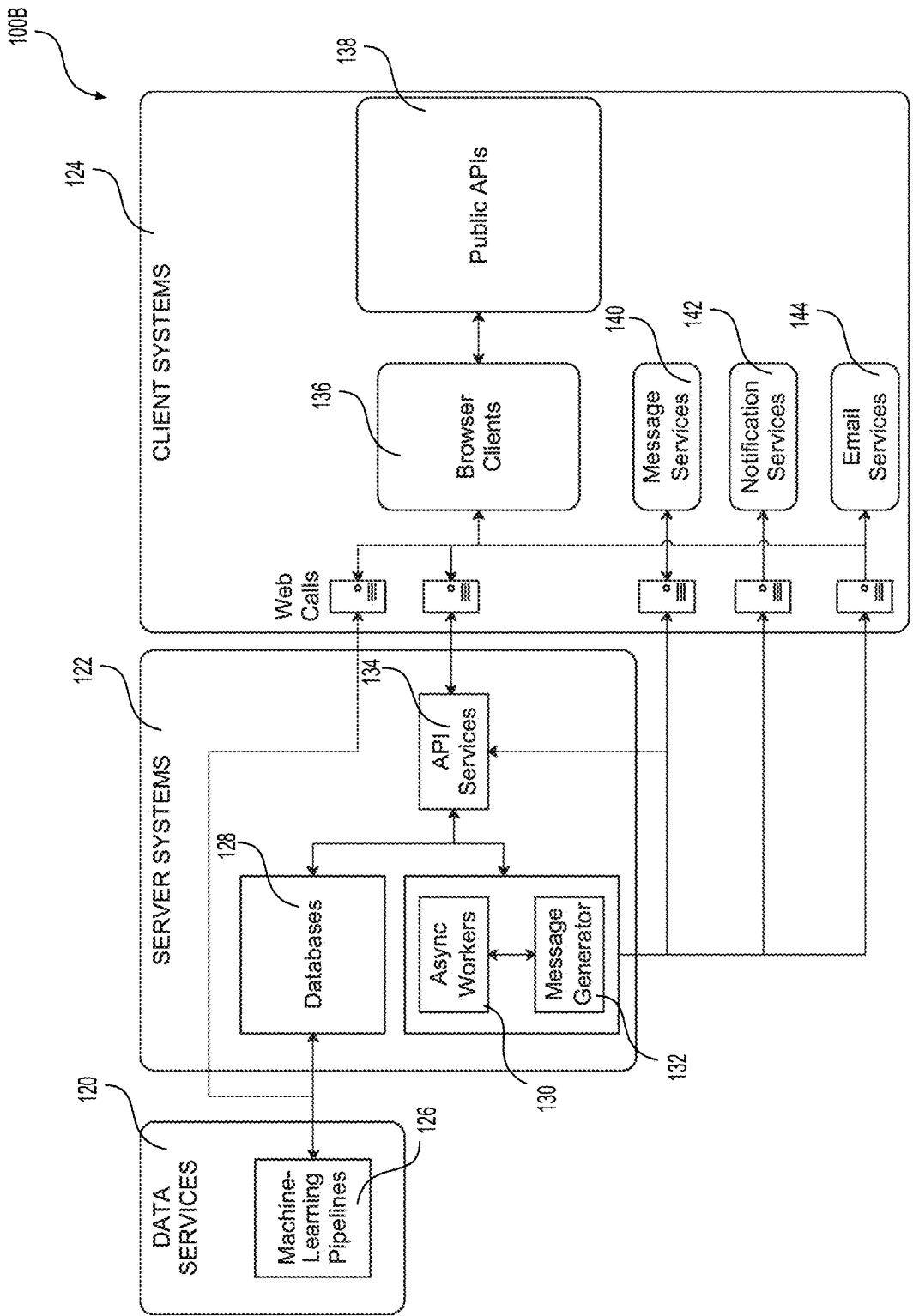
FIG. 1B illustrates an embodiment of an omnichannel procurement orchestration and messaging system.

FIG. 1B illustrates an omnichannel procurement orchestration system server and client messaging system 100B that may be utilized for providing various recommendations, in accordance with the presently disclosed embodiments. In one embodiment, the omnichannel procurement orchestration system server and client messaging system 100B may be included as part of the omnichannel procurement orchestration system 102 as discussed above with respect to FIG. 1A. As depicted, in certain embodiments, the procurement modeling system and network environment 100 may include a data services system 120, a server system 122, and one or more client systems 124. In certain embodiments, the data services system 120 may include a predictive procurement orchestration (PPO) system, which may include one or more machine-learning model pipelines 126 for predicting price reasonableness for procuring a product or service by a purchaser entity, for example.

In certain embodiments, the data services system 120 may be stored to one or more databases 128 and hosted and executed utilizing the server system 122. For example, in one embodiment, the server system 122 may be suitable for generating and providing procurement recommendations to the one or more client systems 124. In certain embodiments, as further illustrated by FIG. 1B, the server system 122 may include one or more asynchronous processing workers 130, a message generator 132, and application programming interface (API) services 134. For example, in some embodiments, the one or more asynchronous processing workers 130, message generator 132, and API services 134 may operate in conjunction (e.g., in the background) for synchronously or asynchronously providing procurement recommendations to the one or more client systems 124 by way of browser client(s) 136, public APIs 138, messaging services 140, notification services 142, and email services 144. For example, in certain embodiments, the one or more client systems 142 may be associated, for example, with any number of respective purchaser entities, supplier entities, sourcing entities, or other entities that may be included as part of a procurement supply chain to which the procurement recommendations may be provided.

Figure 2:
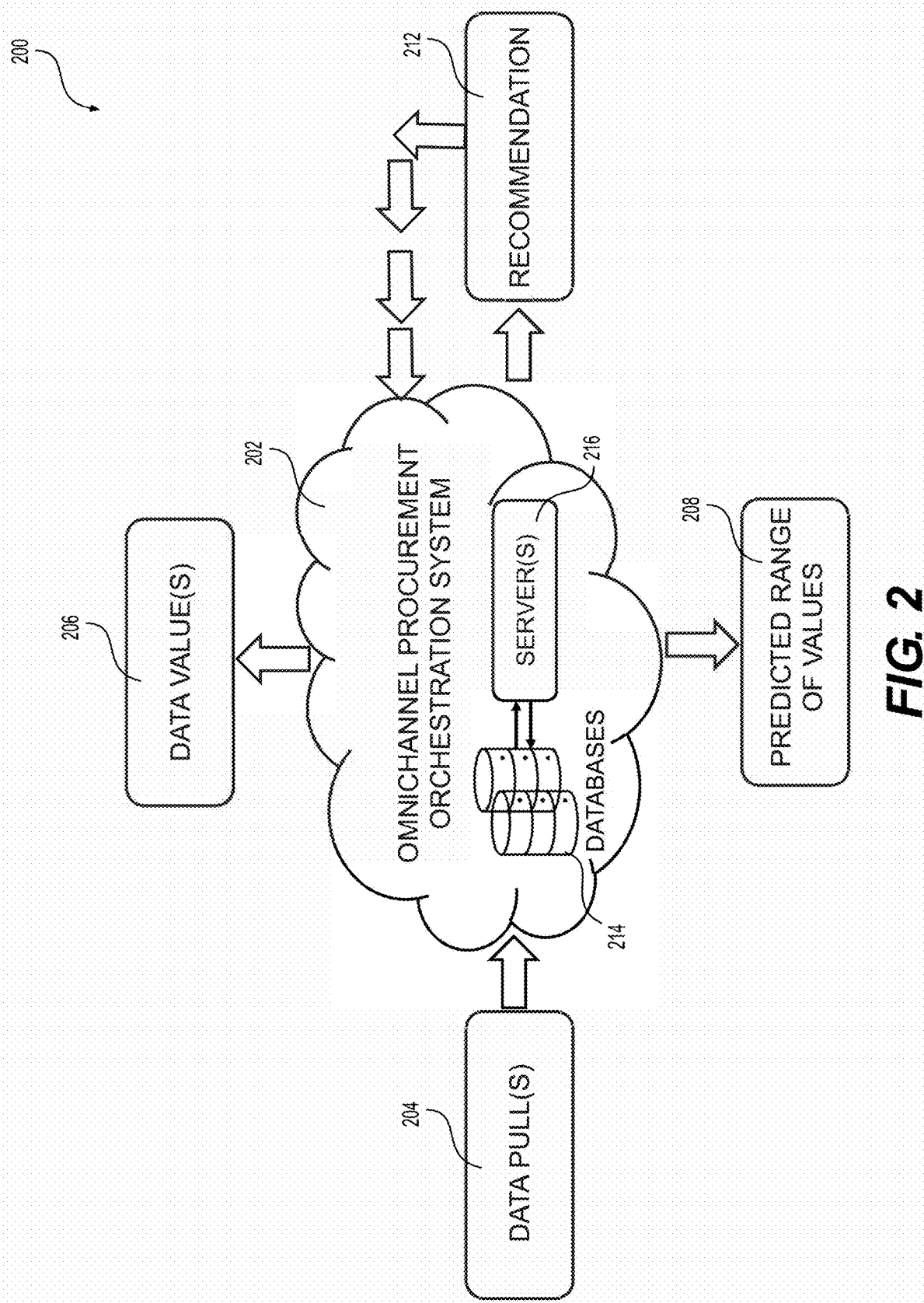
FIG. 2 illustrates an embodiment of an omnichannel procurement orchestration system for generating one or more recommendations for procuring a product or service by a purchaser entity.

FIG. 2 illustrates an omnichannel procurement orchestration system 200 for generating one or more recommendations for procuring a product or service by a purchaser entity, in accordance with the presently disclosed embodiments. In certain embodiments, the omnichannel procurement orchestration system 202, utilizing one or more computing servers 214 and databases 216, may access data 204 for a set of transactions associated with a proposed procurement transaction between at least one of a number of purchaser entities 106 and at least one of a number of supplier entities 108. For example, in one embodiment, the data 204 for the set of transactions may be received from a number of disparate data sources (e.g., databases 105, 107, and 109) and by way of a number of disparate procurement channels (e.g., procurement channels 118A-118I). In certain embodiments, the omnichannel procurement orchestration system 202 may determine a quantifiable feature or attribute associated with the proposed procurement transaction.

For example, in some embodiments, the quantifiable feature or attribute associated with the proposed procurement transaction may include one or more of a price (e.g., a suggested price, a contracted price, a historical price, a negotiated price, and so forth) of a product or service, a ranking associated with one or more of the number of supplier entities 108, a rating associated with one or more of the number of supplier entities 108, a quantity of a product or service, a spend associated with one or more of the number of supplier entities 108, a currency utilized to procure a product or service, or a unique identifier (e.g., purchase order number, requisition order number, invoice number, and so forth) associated with the proposed procurement transaction. In certain embodiments, the procurement orchestration system 202 may then generate and compare one or more data values 206 associated with the proposed procurement transaction and corresponding to the quantifiable feature or attribute to a generated predicted range of values 208 for the quantifiable feature or attribute.

For example, in some embodiments, the predicted range of values 208 may be identified based on the data 204 for the set of transactions received from the number of disparate data sources (e.g., databases 105, 107, and 109) and by way of the number of disparate procurement channels (e.g., procurement channels 118A-118I). For example, in some embodiments, the omnichannel procurement orchestration system 202 may utilize the data 204 to generate a predicted range of values 208, which may include a range of benchmark values, a range of simulated values, or a range of reference values by with the one or more data values 206 associated with the proposed procurement transaction and corresponding to the quantifiable feature or attribute may be compared and evaluated. For example, in an embodiment in which the quantifiable feature or attribute includes a price (e.g., a suggested price, a contracted price, a historical price, a negotiated price) for a particular product or service, the omnichannel procurement orchestration system 202 may generate a predicted range of values 208 including a range of predicted price values (e.g., a predicted price band or other statistical estimation) expected for the particular product or service.

In certain embodiments, in response to the comparison of the one or more data values 206 associated with the proposed procurement transaction and the predicted range of values 208 range of values for the quantifiable feature or attribute, the omnichannel procurement orchestration system 202 may then generate one or more recommendations 212 and provide the one or more recommendations 212 to one or more of the number of stakeholder entities 104, purchaser entities 106, or supplier entities 108 by way of the number of disparate procurement channels (e.g., procurement channels 118A-118I). In one embodiment, the one or more recommendations 212 may include a set of instructions for acting upon the quantifiable feature or attribute associated with the proposed procurement transaction.

For example, in some embodiments, the omnichannel procurement orchestration system 202 may determine, based on the comparison, that the one or more data values 206 associated with the proposed procurement transaction satisfies the predicted range of values range of values 208. In response to determining that the one or more data values 206 satisfies the predicted range of values 208, the omnichannel procurement orchestration system 202 may then generate and provide one or more recommendations 212 to approve the proposed procurement transaction. In some embodiments, the proposed procurement transaction may be then executed based on the approval.

In certain embodiments, the omnichannel procurement orchestration system 202 may determine, based on the comparison, that the one or more data values 206 associated with the proposed procurement transaction fails to satisfy the predicted range of values 208. In one embodiment, in response to determining that the one or more data values 206 fails to satisfy the predicted range of values 208, the omnichannel procurement orchestration system 202 may generate and provide one or more recommendations 212 to reject the proposed procurement transaction. In another embodiment, in response to determining that the one or more data values 206 fails to satisfy the predicted range of values 208, the omnichannel procurement orchestration system 202 may generate and provide one or more recommendations 212 to update the quantifiable feature or attribute associated with the proposed procurement transaction.

In certain embodiments, the one or more recommendations 212 may include any recommendation of a next-best-action toward completing the proposed procurement transaction. For example, in addition to recommendations to approve, reject, or update the quantifiable feature or attribute associated with the proposed procurement transaction, the omnichannel procurement orchestration system 202 may also generate and provide one or more recommendations 212 including, for example, a recommendation to approve a purchase request, a recommendation to a particular supplier entity 108, a recommendation to agree to quote, a recommendation to one or more personnel (e.g., a buyer or purchasing agent, one or more operations, logistics, purchasing, or supply-chain managers, CPO, a director of sourcing and procurement, one or more procurement specialists, or other similar sourcing, procurement, or supply-chain personnel) with respect to an exception in which the one or more personnel may be prompted to intervene, a recommendation to one or more personnel to purchase a particular product or service immediately or within a predetermined time period, or other recommendation of a next-best-action toward an attestation or agreement and execution of the proposed procurement transaction. In certain embodiments, the omnichannel procurement orchestration system 202 may iteratively learn (e.g., learn over time) from generating the one or more recommendations 212, such that the omnichannel procurement orchestration system 202 may iteratively generate one or more recommendations 212 that lead more efficiently to an attestation or agreement and execution of proposed procurement transactions.

Figure 3:
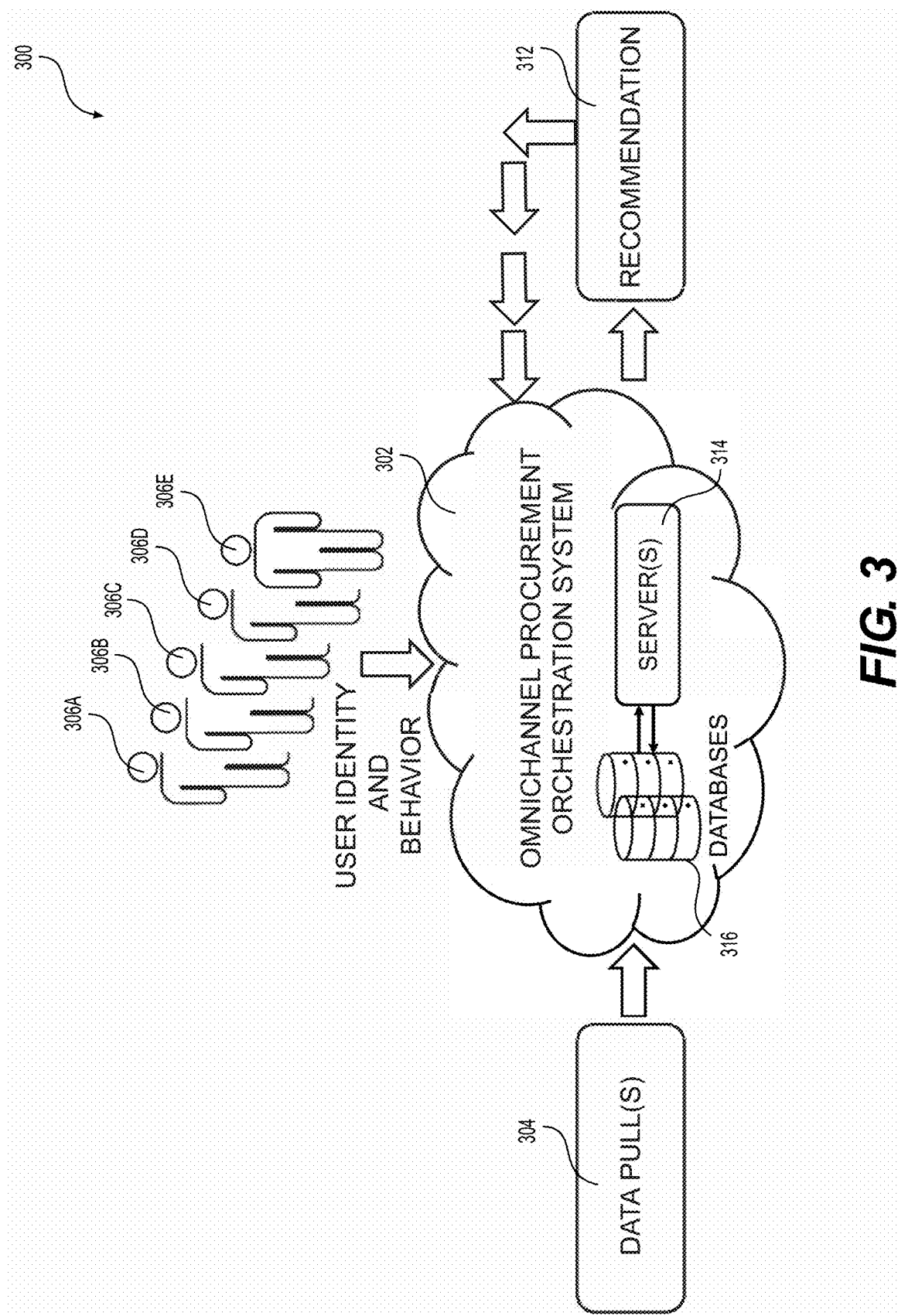
FIG. 3 illustrates an embodiment of an omnichannel procurement orchestration system for generating a personalized recommendation for procuring a product or service by at least one human entity.

FIG. 3 illustrates an omnichannel procurement orchestration system 300 for generating a personalized recommendation for procuring a product or service by at least one human entity, in accordance with the presently disclosed embodiments. In certain embodiments, the omnichannel procurement orchestration system 302, utilizing one or more computing servers 314 and databases 316, may access data 304 for a set of transactions associated with a proposed procurement transaction between at least one of a number of purchaser entities 106 and at least one of a number of supplier entities 108. For example, in one embodiment, the data 304 for the set of transactions may be received from a number of disparate data sources (e.g., databases 105, 107, and 109) and by way of a number of disparate procurement channels (e.g., procurement channels 118A-118I). In certain embodiments, one or more of the transactions may include a line-item.

In certain embodiments, the omnichannel procurement orchestration system 302 may then identify, based on the data 304 for the set of transactions associated with the proposed procurement transaction, an identity or a behavioral pattern of particular one of a number of human entities 306A, 306B, 306C, 306D, and 306E associated with the proposed procurement transaction. For example, in some embodiments, each of the number of human entities 306A, 306B, 306C, 306D, and 306E may be associated with particular one of the number of purchaser entities 106 or particular one of the number of supplier entities 108. In certain embodiments, the omnichannel procurement orchestration system 302 may identify the identity or behavioral pattern of particular one of the number of human entities 306A, 306B, 306C, 306D, and 306E utilizing one or more of a behavioral science model, a machine-learning model, or a game theory model.

In some embodiments, the identity or behavioral pattern of particular one of the number of human entities 306A, 306B, 306C, 306D, and 306E may include one or more of an acceptance rate (e.g., an estimate of how often a particular human entity accepts a price quote, a purchase order, a requisition order, an invoice, and so forth), a rejection rate (e.g., an estimate of how often a particular human entity rejects a price quote, a purchase order, a requisition order, an invoice, and so forth), an exception rate (e.g., an estimate of how often a particular human entity makes an exception with respect to one or more quantifiable features or attributes associated with proposed transactions), a negotiation behavior (e.g., an estimate of how likely a particular human entity is to attest after the first price quote, after 1 round of negotiation, 2 rounds of negotiation, 3 rounds of negotiation, 4 rounds of negotiation, 5 rounds of negotiation, and so forth), an engagement rate (e.g., an estimate of how responsive a particular human entity is to email, text message, or physical mail and/or how interactive the particular human entity with respect to social media), a risk tolerance, or a purchasing behavior (e.g., an estimate of the decision-making process a particular human entity undertakes before purchasing a product or service) of particular one of the number of human entities 306A, 306B, 306C, 306D, and 306E.

In other embodiments, the identity or behavioral pattern of particular one of the number of human entities 306A, 306B, 306C, 306D, and 306E may include one or more of an email address, a job title, an avatar (e.g., a graphical icon or feature representation of a particular human entity, a username representing a particular human entity, or a handle of a particular human entity), a geographical location (e.g., a country, a city, or a region a particular human entity is resident within or conducts business within), an organizational role, or a demographic indicator (e.g., an age group, a sex or gender, a nationality, or a previously disclosed ethnicity of a particular human entity) of particular one of the number of human entities 306A, 306B, 306C, 306D, and 306E.

In certain embodiments, the omnichannel procurement orchestration system 302 may then generate and provide one or more recommendations 312 including a set of instructions for acting upon the proposed procurement transaction based on the identified identity or behavioral pattern of particular one of the number of human entities 306A, 306B, 306C, 306D, and 306E. Specifically, in accordance with the presently disclosed embodiments, the omnichannel procurement orchestration system 302 may personalize the one or more recommendations 312 (e.g., price quote recommendations, supplier recommendations, supplier ranking recommendations, and so forth) based on the identity and behavior of a particular one of the number of human entities 306A, 306B, 306C, 306D, and 306E as opposed to, for example, an identity or behavior of a particular business entity, departmental entity, or organizational entity.

Indeed, by generating and providing one or more recommendations 312 based on the identified identity or behavioral pattern of a particular one of the number of human entities 306A, 306B, 306C, 306D, and 306E, the omnichannel procurement orchestration system 302 may learn and generate various inferences with respect to the decision-making and purchasing behavioral characteristics relevant to a particular one of the number of human entities 306A, 306B, 306C, 306D, and 306E and utilize such inferences to customize and personalize the one or more recommendations 312 to a particular one of the number of human entities 306A, 306B, 306C, 306D, and 306E. In certain embodiments, the omnichannel procurement orchestration system 302 may perform continuous behavioral analysis, pattern monitoring, an identity profiling and iteratively update the one or more recommendations 312 to improve the quality, precision, and attestation rate of the one or more recommendations 312 over time.

In certain embodiments, the omnichannel procurement orchestration system 102 as discussed above with respect to FIG. 1A may be further utilized for generating one or more recommendations 112 based on a scoring for each of a number of procurement channels or procurement activities to be executed for procuring a product or service. In certain embodiments, the omnichannel procurement orchestration system 102 mat access data for a set of transactions associated with a proposed procurement transaction between at least one of a number of purchaser entities 106 and at least one of a number of supplier entities 108. For example, as discussed above, data for the set of transactions may be received by the omnichannel procurement orchestration system 102 from the databases 105 associated with the number of stakeholder entities 104, the databases 107 associated with the number of purchaser entities 106, and the databases 109 associated with the number of supplier entities 108. In some embodiments, data for the set of transactions may be received by way of the number of procurement channels 110.

In certain embodiments, the omnichannel procurement orchestration system 102 may then determine, based on the data for the set of transactions associated with the proposed procurement transaction, one or more procurement activities to be performed to execute the proposed procurement transaction. For example, in certain embodiments, the number of procurement channels 110 may include a series of any of various processes or activities suitable for requesting, approving, purchasing, receiving, and/or paying for a product or service, and, further, some combination of both the procurement activities to be performed (e.g., creating or submitting a request, approving a request, creating or submitting a price quote or purchasing order, approving or rejecting a price quote or purchasing order, receiving or transmitting a price quote or purchasing order, confirming a price quote or purchasing order, receiving or delivering one or more products or services, receiving or submitting an invoice, approving or rejecting an invoice, paying or receiving payment for an invoice) and the communications or transactions system (e.g., one or more software-based procurement applications 118A, one or more web-based or cloud-based purchase catalogs systems 118B, one or more mobile devices 118C, 118D, 118E, one or more delivery vehicle-based systems 118F, in-person negotiations 118G, Web3 applications and transactions 118H, phone-based or voiced-based procurement ordering and services 118I, and so forth) by which the series of various processes or activities may be executed.

In certain embodiments, the omnichannel procurement orchestration system 102 may then generate and assign a score for each of the number of procurement activities and/or each of the number of procurement channels. For example, in some embodiments, the score for each of the number of procurement activities and/or each of the number of procurement channels may include a likelihood of a favorable outcome for the proposed procurement transaction. Specifically, the score for each of the number of procurement activities and/or each of the number of procurement channels may include a filtering value, ranking value, or an impact score indicating which of a number of procurement activities and/or procurement channels should be utilized to efficiently execute the proposed procurement transaction. In certain embodiments, the omnichannel procurement orchestration system 102 may then generate one or more recommendations based on the score for each of the number of procurement activities and/or each of the number of procurement channels.

Thus, in accordance with the presently disclosed embodiments, the omnichannel procurement orchestration system 102 may generate relevant impact scores for each of the number of procurement activities and/or each of the number of procurement channels within an omnichannel procurement orchestration system and network environment 100A and indicate a match and identify at least one of a number of procurement activities and at least one of a number procurement channels to be utilized to produce a most favorable financial outcome, economic outcome, or service-related outcome. In this way, by matching and identifying particular procurement activities and particular procurement channels that maximize the likelihood of a favorable financial outcome, economic outcome, or service-related outcome, the omnichannel procurement orchestration system 102 may iteratively increase efficiency and procurement impact for executing proposed procurement transactions in accordance with the presently disclosed embodiments.

Figure 4:
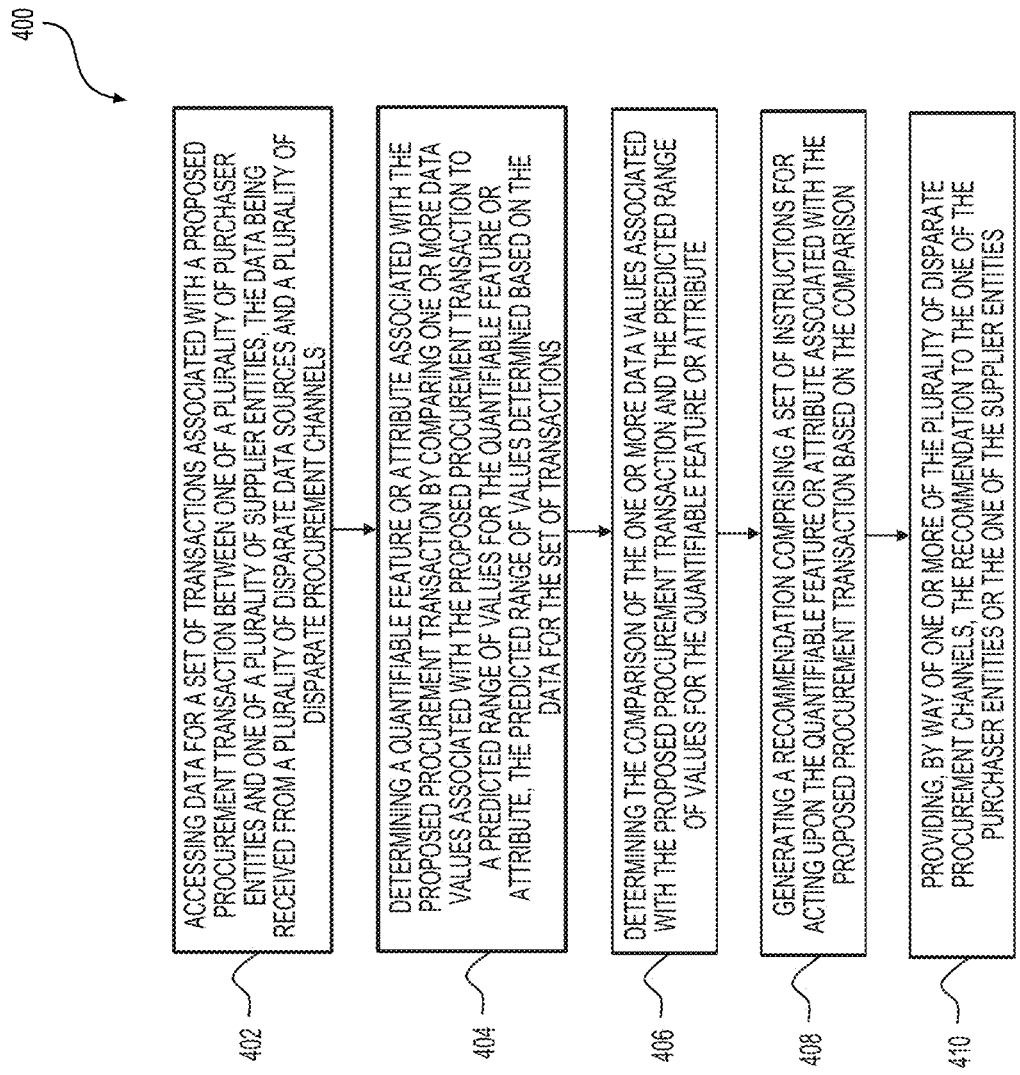
FIG. 4 illustrates a flow diagram of a method for generating one or more recommendations for procuring a product or service by a purchaser entity.

FIG. 4 illustrates a flow diagram of a method 400 for generating one or more recommendations for procuring a product or service by a purchaser entity, in accordance with the presently disclosed embodiments. The method 400 may be performed utilizing one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), a deep learning processor (DLP), a tensor processing unit (TPU), neuromorphic processing unit (NPU), a wafer-scale engine (WSE), or any of various hardware artificial intelligence (AI) accelerators) that may be suitable for processing various transactions and making one or more decisions based thereon, software (e.g., instructions running/executing on one or more processing devices), firmware (e.g., microcode), or some combination thereof.

The method 400 may begin at block 402 with one or more processing devices accessing, by an omnichannel procurement orchestration system, data for a set of transactions associated with a proposed procurement transaction between at least one of a plurality of purchaser entities and at least one of a plurality of supplier entities. For example, in one embodiment, the data for the set of transactions may be received from a plurality of disparate data sources and by way of a plurality of disparate procurement channels. The method 400 may continue at block 404 with one or more processing devices determining, by the omnichannel procurement orchestration system, a quantifiable feature or attribute associated with the proposed procurement transaction by comparing one or more data values associated with the proposed procurement transaction to a predicted range of values for the quantifiable feature or attribute. For example, in one embodiment, the predicted range of values may be identified based on the data for the set of transactions received from the plurality of disparate data sources and by way of the plurality of disparate procurement channels.

The method 400 may then continue at block 406 with one or more processing devices determining, by the omnichannel procurement orchestration system, the comparison of the one or more data values associated with the proposed procurement transaction and the predicted range of values for the quantifiable feature or attribute. The method 400 may then continue at block 408 with one or more processing devices generating, by the omnichannel procurement orchestration system, a recommendation comprising a set of instructions for acting upon the quantifiable feature or attribute associated with the proposed procurement transaction based on the comparison. The method 400 may then conclude at block 410 with one or more processing devices providing, by the omnichannel procurement orchestration system, and by way of one or more of the plurality of disparate procurement channels, the recommendation to the at least one of the plurality of purchaser entities or the at least one of the plurality of supplier entities.

Figure 5:
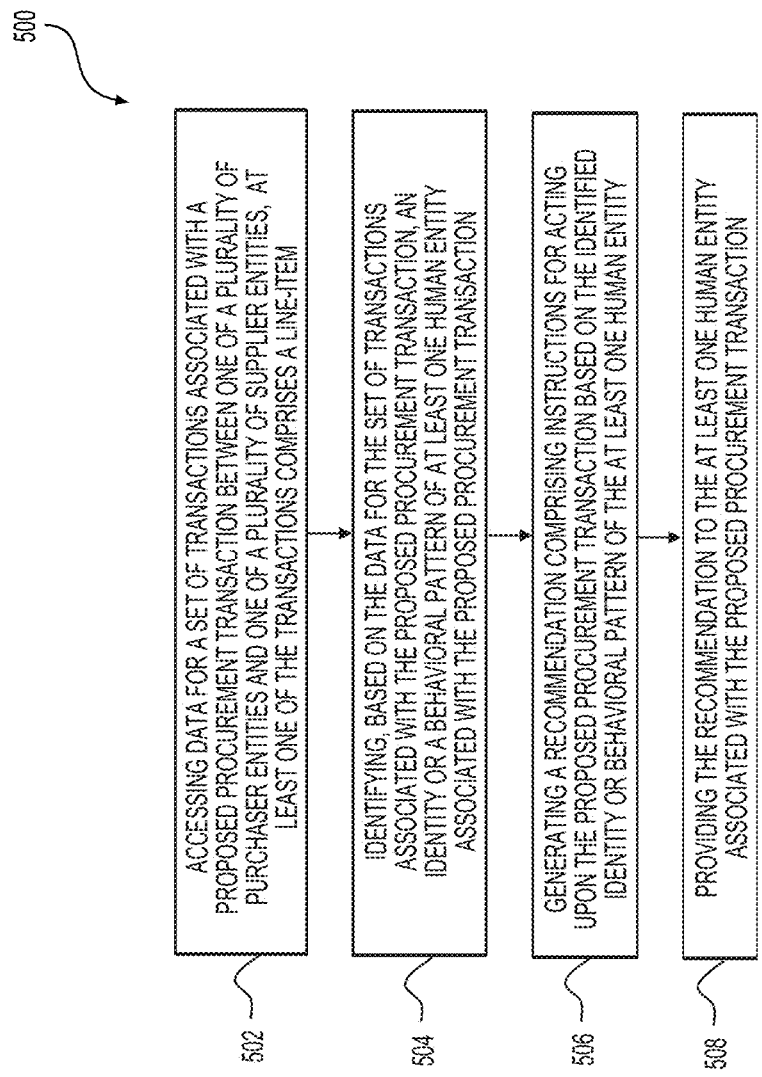
FIG. 5 illustrates a flow diagram of a method for generating a personalized recommendation for procuring a product or service by at least one human entity.

FIG. 5 illustrates a flow diagram of a method 500 for generating a personalized recommendation for procuring a product or service by at least one human entity, in accordance with the presently disclosed embodiments. The method 500 may be performed utilizing one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), a deep learning processor (DLP), a tensor processing unit (TPU), neuromorphic processing unit (NPU), a wafer-scale engine (WSE), or any of various hardware artificial intelligence (AI) accelerators) that may be suitable for processing various transactions and making one or more decisions based thereon, software (e.g., instructions running/executing on one or more processing devices), firmware (e.g., microcode), or some combination thereof.

The method 500 may begin at block 502 with one or more processing devices accessing, by an omnichannel procurement orchestration system, data for a set of transactions associated with a proposed procurement transaction between at least one of a plurality of purchaser entities and at least one of a plurality of supplier entities. For example, in one embodiment, at least one of the transactions may include a line-item. The method 500 may continue at block 504 with one or more processing devices identifying, by the omnichannel procurement orchestration system, and based on the data for the set of transactions associated with the potential procurement transaction, an identity or a behavioral pattern of at least one human entity associated with the proposed procurement transaction. The method 500 may then continue at block 506 with one or more processing devices generating, by the procurement orchestration system, a recommendation comprising a set of instructions for acting upon the proposed procurement transaction based on the identified identity or behavioral pattern of the at least one human entity. The method 500 may then conclude at block 508 with one or more processing devices providing, by the omnichannel procurement orchestration system, the recommendation to the at least one human entity associated with the proposed procurement transaction.

Figure 6:
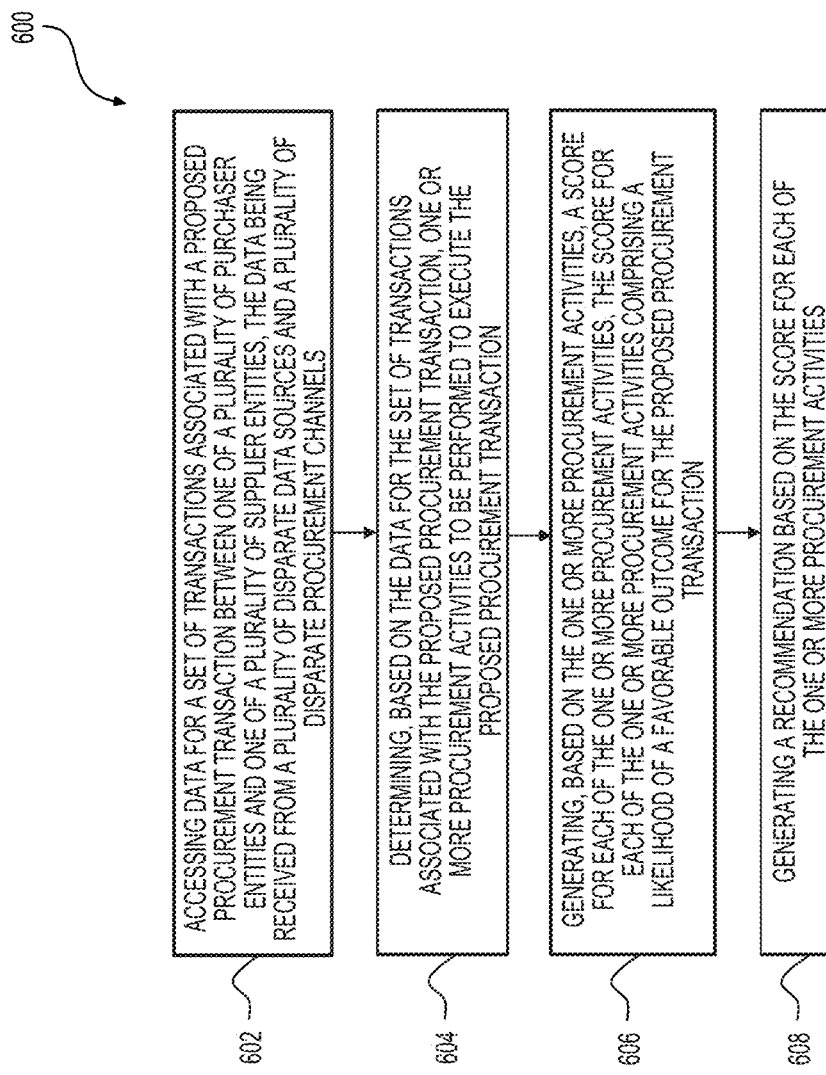
FIG. 6 illustrates a flow diagram of a method for generating one or more recommendations based on a scoring for each of a plurality of procurement activities to be executed for procuring a product or service.

FIG. 6 illustrates a flow diagram of a method 600 for generating one or more recommendations based on a scoring for each of a plurality of procurement activities to be executed for procuring a product or service, in accordance with the presently disclosed embodiments. The method 600 may be performed utilizing one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), a deep learning processor (DLP), a tensor processing unit (TPU), neuromorphic processing unit (NPU), a wafer-scale engine (WSE), or any of various hardware artificial intelligence (AI) accelerators) that may be suitable for processing various transactions and making one or more decisions based thereon, software (e.g., instructions running/executing on one or more processing devices), firmware (e.g., microcode), or some combination thereof.

The method 600 may begin at block 602 with one or more processing devices access data for a set of transactions associated with a proposed procurement transaction between at least one of a plurality of purchaser entities and at least one of a plurality of supplier entities. For example, in some embodiments, the data for the set of transactions may be received from a plurality of disparate data sources and by way of a plurality of disparate procurement channels. The method 600 may continue at block 604 with one or more processing devices determining, based on the data for the set of transactions associated with the proposed procurement transaction, one or more procurement activities to be performed to execute the proposed procurement transaction. The method 600 may then continue at block 606 with one or more processing devices generating, based on the one or more procurement activities, a score for each of the one or more procurement activities. For example, in some embodiments, the score for each of the one or more procurement activities may include a likelihood of a favorable outcome for the proposed procurement transaction. The method 600 may then conclude at block 608 with one or more processing devices generating a recommendation based on the score for each of the one or more procurement activities.

Figure 7:
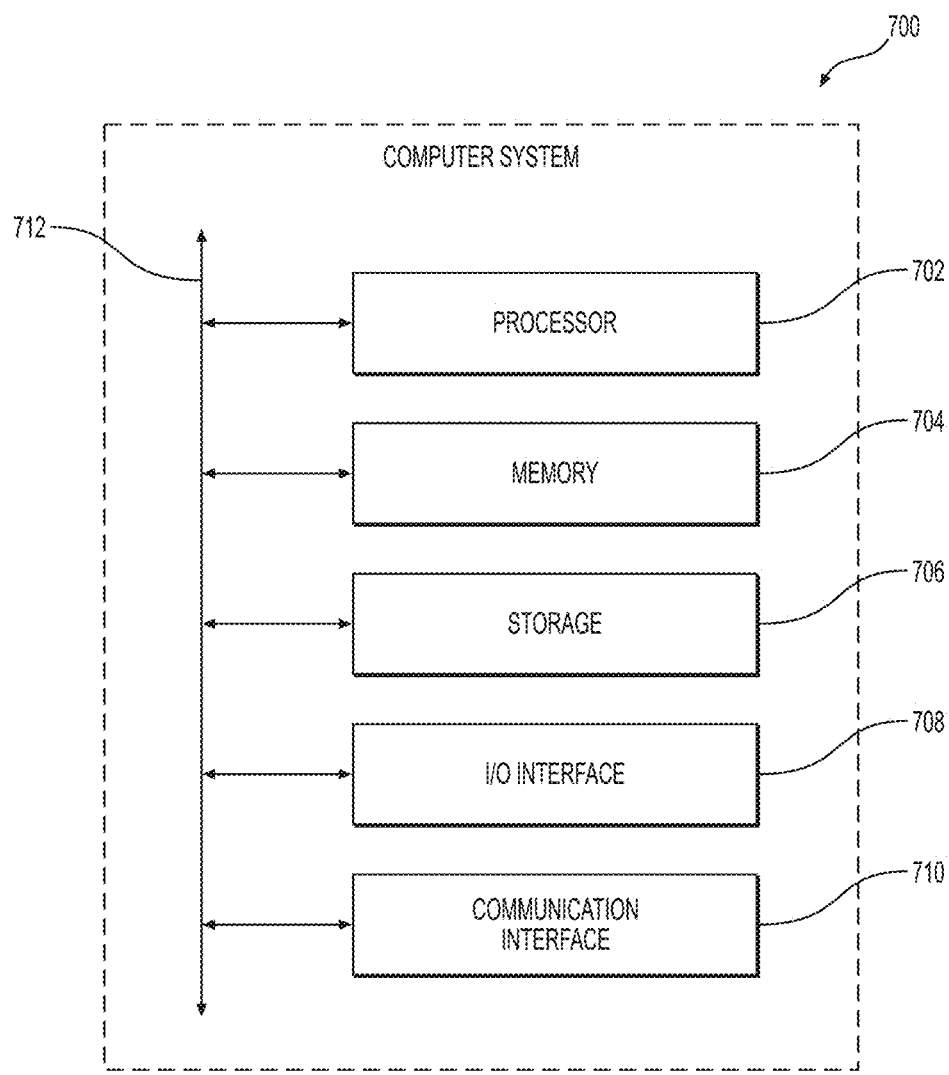
FIG. 7 illustrates an example omnichannel procurement orchestration computing system.

FIG. 7 illustrates an example omnichannel procurement orchestration computing system 700 (which may be included as part of the procurement services platform 102) that may be utilized for performing the techniques described herein, in accordance with the presently disclosed embodiments. In certain embodiments, the omnichannel procurement orchestration computing system 700 may perform one or more steps of one or more methods described or illustrated herein. In certain embodiments, omnichannel procurement orchestration computing system 700 may provide functionality described or illustrated herein. In certain embodiments, software running on omnichannel procurement orchestration computing system 700 performs one or more steps of one or more methods described or illustrated herein or provides functionality described or illustrated herein. Certain embodiments include one or more portions of the omnichannel procurement orchestration computing system 700. Herein, reference to a computer system may encompass a computing device, and vice versa, where appropriate. Moreover, reference to a computer system may encompass one or more computer systems, where appropriate.

This disclosure contemplates any suitable number of omnichannel procurement orchestration computing systems 700. This disclosure contemplates computer system 700 taking any suitable physical form. As example and not by way of limitation, computer system 700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more procurement services computing systems 700; be unitary or distributed; span multiple locations; span multiple machines; span multiple data centers; or reside in a cloud, which may include one or more cloud components in one or more networks.

Where appropriate, the omnichannel procurement orchestration computing system 700 may perform without substantial spatial or temporal limitation one or more steps of one or more methods described or illustrated herein. As an example, and not by way of limitation, the omnichannel procurement orchestration computing system 700 may perform in real time or in batch mode one or more steps of one or more methods described or illustrated herein. The omnichannel procurement orchestration computing system 700 may perform at different times or at different locations one or more steps of one or more methods described or illustrated herein, where appropriate.

In certain embodiments, computer system 700 includes a processor 702, memory 702, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement. In certain embodiments, processor 702 includes hardware for executing instructions, such as those making up a computer program. As an example, and not by way of limitation, to execute instructions, processor 702 may retrieve (or fetch) the instructions from an internal register, an internal cache, memory 702, or storage 706; decode and execute them; and then write one or more results to an internal register, an internal cache, memory 702, or storage 706. In certain embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 702 or storage 706, and the instruction caches may speed up retrieval of those instructions by processor 702.

Data in the data caches may be copies of data in memory 702 or storage 706 for instructions executing at processor 702 to operate on; the results of previous instructions executed at processor 702 for access by subsequent instructions executing at processor 702 or for writing to memory 702 or storage 706; or other suitable data. The data caches may speed up read or write operations by processor 702. The TLBs may speed up virtual-address translation for processor 702. In certain embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In certain embodiments, memory 702 includes main memory for storing instructions for processor 702 to execute or data for processor 702 to operate on. As an example, and not by way of limitation, computer system 700 may load instructions from storage 706 or another source (such as, for example, another computer system 700) to memory 702. Processor 702 may then load the instructions from memory 702 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 702. In certain embodiments, processor 702 executes only instructions in one or more internal registers or internal caches or in memory 702 (as opposed to storage 706 or elsewhere) and operates only on data in one or more internal registers or internal caches or in memory 702 (as opposed to storage 706 or elsewhere).

One or more memory buses (which may each include an address bus and a data bus) may couple processor 702 to memory 702. Bus 712 may include one or more memory buses, as described below. In certain embodiments, one or more memory management units (MMUs) reside between processor 702 and memory 702 and facilitate accesses to memory 702 requested by processor 702. In certain embodiments, memory 702 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 702 may include one or more memory devices 702, where appropriate. Although this disclosure describes and illustrates particular memory, this disclosure contemplates any suitable memory.

In certain embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In certain embodiments, storage 706 is non-volatile, solid-state memory. In certain embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In certain embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 706 for them. Where appropriate, I/O interface 708 may include one or more device or software drivers enabling processor 702 to drive one or more of these I/O devices. I/O interface 708 may include one or more I/O interfaces 706, where appropriate. Although this disclosure describes and illustrates a particular I/O interface, this disclosure contemplates any suitable I/O interface.

In certain embodiments, communication interface 710 includes hardware, software, or both providing one or more interfaces for communication (such as, for example, packet-based communication) between computer system 700 and one or more other computer systems 700 or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it.

As an example, and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In certain embodiments, bus 712 includes hardware, software, or both coupling components of computer system 700 to each other. As an example, and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to this disclosure are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates certain embodiments as providing particular advantages, certain embodiments may provide none, some, or all of these advantages.

What is claimed is:

1. A method for generating a recommendation for procuring a particular line-item by a purchaser, comprising, by one or more servers of an omnichannel procurement orchestration system:

receiving, by the omnichannel procurement orchestration system, data for a set of transactions associated with a proposed procurement transaction between at least one of a plurality of purchasers and at least one of a plurality of suppliers, wherein the data for the set of transactions is received from a plurality of disparate data sources associated with disparate data structures or schemas, wherein the data for the set of transactions is received by way of a plurality of disparate procurement channels, wherein the plurality of disparate procurement channels comprises a plurality of software-based applications or computing devices separate from the omnichannel procurement orchestration system, and wherein the data comprises:
 a set of attributes of a plurality of line-items associated with the set of transactions, wherein the plurality of line-items comprises one or more line-items other than the particular line-item, and
 a set of attributes of the at least one of a plurality of suppliers;

determining, by the omnichannel procurement orchestration system, a quantifiable feature or attribute associated with the proposed procurement transaction by comparing one or more data values associated with the proposed procurement transaction to a predicted range of values for the quantifiable feature or attribute, the predicted range of values being identified using machine learning based on the data for the set of transactions received from the plurality of disparate data sources and by way of the plurality of disparate procurement channels; and in response to the comparison of the one or more data values associated with the proposed procurement transaction and the predicted range of values for the quantifiable feature or attribute:
 generating, by one or more machine-learning models of the omnichannel procurement orchestration system, a recommendation comprising a set of instructions for acting upon the quantifiable feature or attribute associated with the proposed procurement transaction and further comprising a next-best-action toward completing the proposed procurement transaction, wherein generating the recommendation further comprises:
  determining, based on the comparison, that the one or more data values associated with the proposed procurement transaction fails to satisfy the predicted range of values; and
  in response to determining that the one or more data values associated with the proposed procurement transaction fails to satisfy the predicted range of values, generating the recommendation to update the quantifiable feature or attribute associated with the proposed procurement transaction; and
 providing, by the omnichannel procurement orchestration system, and by way of one or more of the plurality of disparate procurement channels, the recommendation to the at least one of the plurality of purchasers or the at least one of the plurality of suppliers; and receiving, by the omnichannel procurement orchestration system, selection data comprising a user-selected approval, rejection, or update of the set of instructions or the next-best action of the recommendation;

executing the recommendation based on the selection data comprising the user-selected approval, rejection, or update of the set of instructions or the next-best action of the recommendation;

iteratively training the one or more machine-learning models of the omnichannel procurement orchestration system based at least partially on the selection data comprising the user-selected approval, rejection, or update of the set of instructions or the next-best action of the recommendation; and executing, by the omnichannel procurement orchestration system, the iteratively trained one or more machine-learning models to determine one or more updated recommendations.

2. The method of claim 1, wherein the set of transactions comprises a line-item, an identification of the plurality of suppliers, and an identification of the plurality of purchasers.

3. The method system of claim 2, wherein the line-item comprises one or more of a price of a product or service, a quantity of the product or service, or a unit of measure (UOM) with respect to the product or service.

4. The method of claim 1, wherein the data for the set of transactions comprises one or more of line-item master data and transaction data associated with one or more previous procurement transactions or line-item master data and transaction associated with the proposed procurement transaction.

5. The method of claim 1, wherein the quantifiable feature or attribute associated with the proposed procurement transaction comprises one or more of a price of a product or service, a ranking associated with one or more of the plurality of suppliers, a rating associated with one or more of the plurality of suppliers, a quantity of a product or service, a spend associated with one or more of the plurality of suppliers, a currency utilized to procure a product or service, or a unique identifier associated with the proposed procurement transaction.

6. The method of claim 1, wherein the predicted range of values for the quantifiable feature or attribute comprises one or more statistical estimations by which the one or more data values are evaluated.

7. The method of claim 1, further comprising:
determining, based on the comparison, that the one or more data values associated with the proposed procurement transaction satisfies the predicted range of values; and
in response to determining that the one or more data values associated with the proposed procurement transaction satisfies the predicted range of values:
generating a recommendation to approve the proposed procurement transaction.

8. The method of claim 7, further comprising executing the proposed procurement transaction based on the approval.

9. The method of claim 1, further comprising:
determining, based on the comparison, that the one or more data values associated with the proposed procurement transaction fails to satisfy the predicted range of values; and
in response to determining that the one or more data values associated with the proposed procurement transaction fails to satisfy the predicted range of values:
generating a recommendation to reject the proposed procurement transaction.

10. The method of claim 1, wherein the next-best-action toward completing the proposed procurement transaction comprises one or more of a recommendation to approve a purchase request, a recommendation to the at least one of the plurality of suppliers, a recommendation to agree to a price quote, and a recommendation to purchase the particular line-item within a predetermined time period.

11. An omnichannel procurement orchestration system for generating a recommendation for procuring a product or service particular line-item by a purchaser, comprising:

one or more non-transitory computer-readable storage media including instructions; and one or more processors coupled to the one or more storage media, the one or more processors configured to execute the instructions to:

receive data for a set of transactions associated with a proposed procurement transaction between at least one of a plurality of purchasers and at least one of a plurality of suppliers,
wherein the data for the set of transactions is received from a plurality of disparate data sources associated with disparate data structures or schemas,
wherein the data for the set of transactions is received by way of a plurality of disparate procurement channels,
wherein the plurality of disparate procurement channels comprises a plurality of software-based applications or computing devices separate from the omnichannel procurement orchestration system, and
wherein the data comprises:
a set of attributes of a plurality of line-items associated with the set of transactions, wherein the plurality of line-items comprises one or more line-items other than the particular line-item, and
a set of attributes of the at least one of a plurality of suppliers;

determine a quantifiable feature or attribute associated with the proposed procurement transaction by comparing one or more data values associated with the proposed procurement transaction to a predicted range of values for the quantifiable feature or attribute, the predicted range of values being identified using machine learning based on the data for the set of transactions received from the plurality of disparate data sources and by way of the plurality of disparate procurement channels; and in response to the comparison of the one or more data values associated with the proposed procurement transaction and the predicted range of values for the quantifiable feature or attribute:
generate, by one or more machine-learning models, a recommendation comprising a set of instructions for acting upon the quantifiable feature or attribute associated with the proposed procurement transaction and further comprising a next-best-action toward completing the proposed procurement transaction, wherein generating the recommendation further comprises:
determining, based on the comparison, that the one or more data values associated with the proposed procurement transaction fails to satisfy the predicted range of values; and
in response to determining that the one or more data values associated with the proposed procurement transaction fails to satisfy the predicted range of values, generating the recommendation to update the quantifiable feature or attribute associated with the proposed procurement transaction; and
provide, by way of one or more of the plurality of disparate procurement channels, the recommendation to the at least one of the plurality of purchasers or the at least one of the plurality of suppliers; and receive, by the omnichannel procurement orchestration system, selection data comprising a user-selected approval, rejection, or update of the set of instructions or the next-best action of the recommendation;

execute the recommendation based on the selection data comprising the user-selected approval, rejection, or update of the set of instructions or the next-best action of the recommendation;

iteratively train the one or more machine-learning models of the omnichannel procurement orchestration system based at least partially on the selection data comprising the user-selected approval, rejection, or update of the set of instructions or the next-best action of the recommendation; and execute, by the omnichannel procurement orchestration system, the iteratively trained one or more machine-learning models to determine one or more updated recommendations.

\* \* \* \* \*